(12) United States Patent
Cherkasova et al.

(10) Patent No.: US 8,112,756 B2
(45) Date of Patent: Feb. 7, 2012

(54) SYSTEM AND METHOD FOR EVALUATING A WORKLOAD AND ITS IMPACT ON PERFORMANCE OF A WORKLOAD MANAGER

(75) Inventors: Ludmila Cherkasova, Fort Collins, CO (US); Jerome Rolia, Fort Collins, CO (US); Clifford A. McCarthy, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1601 days.

(21) Appl. No.: 11/489,971

(22) Filed: Jul. 20, 2006

(65) Prior Publication Data

US 2008/0022285 A1   Jan. 24, 2008

(51) Int. Cl.
    G06F 9/46     (2006.01)
    G06F 15/173   (2006.01)
    G06J 1/00     (2006.01)
    G06G 7/12     (2006.01)

(52) U.S. Cl. ............ 718/104; 718/105; 709/226; 708/1; 708/802; 708/806

(58) Field of Classification Search .................. 718/104
    See application file for complete search history.

(56) References Cited

U.S. PATENT DOCUMENTS

| | | | |
|---|---|---|---|
| 5,408,663 A | 4/1995 | Miller | |
| 5,598,532 A | 1/1997 | Liron | |
| 6,141,686 A | 10/2000 | Jackowski et al. | |
| 6,721,796 B1 | 4/2004 | Wong | |
| 6,745,221 B1 | 6/2004 | Ronca | |
| 2003/0163734 A1* | 8/2003 | Yoshimura et al. | 713/201 |
| 2005/0055694 A1* | 3/2005 | Lee | 718/100 |
| 2005/0076337 A1* | 4/2005 | Mangan | 718/100 |
| 2008/0022285 A1* | 1/2008 | Cherkasova et al. | 718/104 |

OTHER PUBLICATIONS

U.S. Appl. No. 11/134,681, filed May 19, 2005.
Rolia, J. et al., "A Capacity Management Service for Resource Pools", 9 pages.
"gWLM: Reference and Additional Topics", Version A.01.01.x; Hewlett-Packard Co. May 2005, 24 pages.
"HP-UX Workload Manager User's Guide", Version A.03.01; Hewlett-Packard Co., 120 pages.

* cited by examiner

*Primary Examiner* — Meng An
*Assistant Examiner* — Abdullah Al Kawsar

(57) ABSTRACT

A system comprises a workload evaluator that is operable to receive a representative workload that is representative of competing demands for capacity of at least one shared computing resource. The workload evaluator evaluates the representative workload and computes a metric representing a degree of burstiness of demands present in the representative workload. The metric representing degree of burstiness of the representative workload may be used for estimating an upper bound on quality of service provided by a workload manager to the representative workload. The metric may also be used for evaluating at least one scheduler parameter setting of the workload manager to aid in determining an optimal parameter setting based at least in part on the estimated impact of the representative workload on QoS provided by the workload manager.

17 Claims, 6 Drawing Sheets

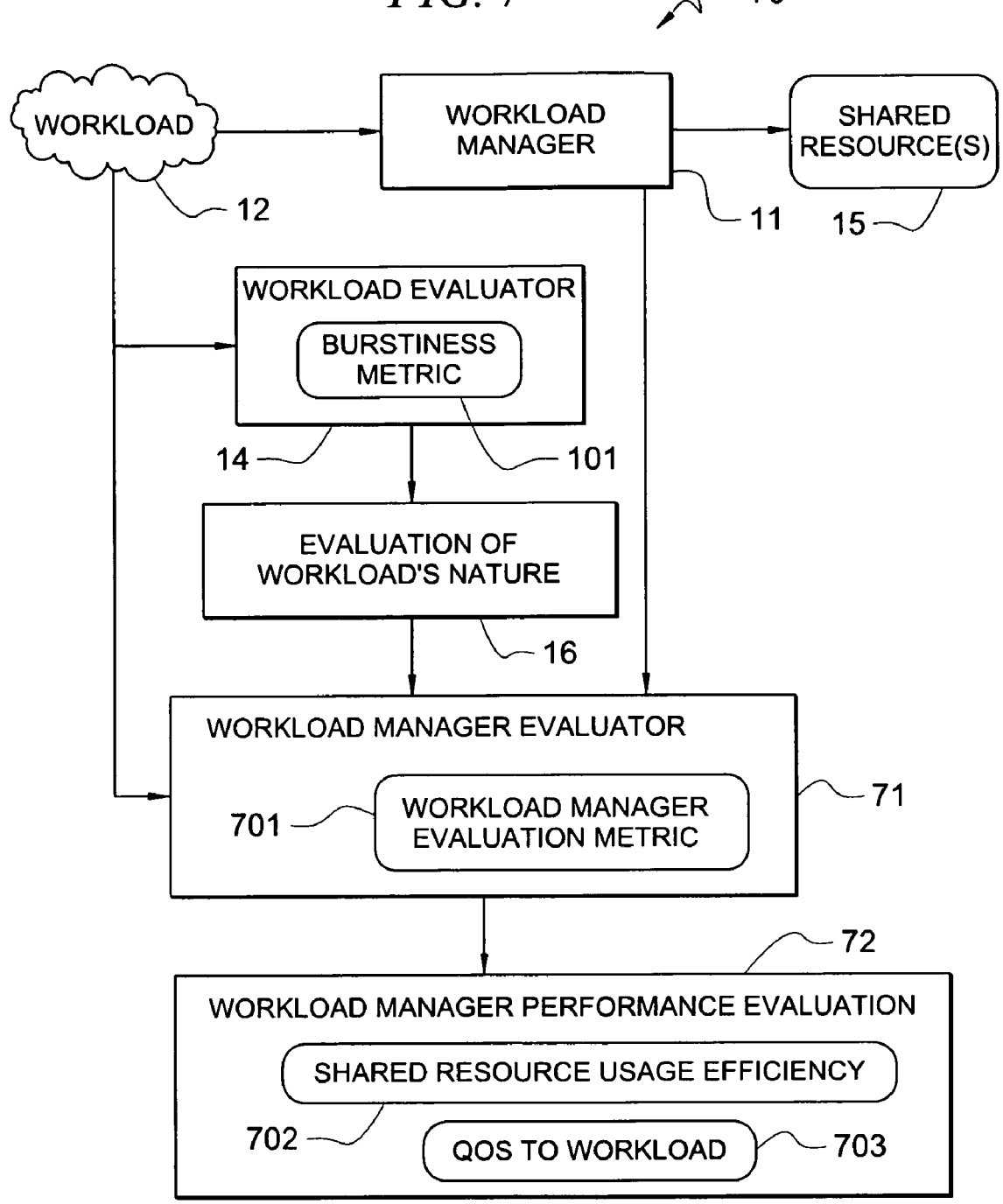

SYSTEM AND METHOD FOR EVALUATING A WORKLOAD AND ITS IMPACT ON PERFORMANCE OF A WORKLOAD MANAGER

CROSS-REFERENCE TO RELATED APPLICATIONS

The present application is related to concurrently filed and commonly assigned U.S. patent application Ser. No. 11/489, 968 titled "SYSTEM AND METHOD FOR EVALUATING PERFORMANCE OF A WORKLOAD MANAGER", and concurrently filed and commonly assigned U.S. patent application Ser. No. 11/489,967 titled "SYSTEM AND METHOD FOR ALLOCATING CAPACITY OF SHARED RESOURCES TO A WORKLOAD", the disclosures of which are hereby incorporated herein by reference. The present application is also related to co-pending and commonly assigned U.S. patent application Ser. No. 11/134,681 filed May 19, 2005 titled "SYSTEM AND METHOD FOR DETERMINING A PARTITION OF A CONSUMER'S RESOURCE ACCESS DEMANDS BETWEEN A PLURALITY OF DIFFERENT CLASSES OF SERVICE," the disclosure of which is hereby incorporated herein by reference.

FIELD OF THE INVENTION

The following description relates generally to managing access to resources, and more specifically to systems and methods for evaluating the impact of workload burstiness on quality of service delivered by a workload manager.

DESCRIPTION OF RELATED ART

Resource pools are collections of computing resources, such as clusters of servers, racks of blades, or other computing resources that offer shared access to computing capacity. The utility data center (UDC) available from Hewlett-Packard Company is one example of a resource pool. Depending on the granularity of a given implementation, a resource pool may be a collection of separate computing devices (e.g., separate servers, separate clusters of servers, etc.) or it may be a collection of resources on a common computing device (e.g., multiple processors on a single server). Various types of resource pools are known, and techniques have been developed for managing access to such resource pools. For instance, virtualization services have been developed that offer interfaces that support the lifecycle management (e.g., create, destroy, move, size capacity) of resource containers (e.g., virtual machines, virtual disks) that provide access to shares of resource capacity (e.g., CPU, memory, input/output). Various consumers (e.g., applications) may share access to the resources of a resource pool. That is, various consumers may share utilization of the resources in a resource pool for servicing their respective workloads. In this sense, a "consumer" refers to anything (e.g., process, etc.) that consumes capacity of the pool's resources. A consumer generally consumes capacity for use in servicing the consumer's workload. Thus, the consumer has a "demand" for capacity from the resource pool for servicing its workload in a desired manner. In some implementations, workloads are assigned to the resource containers which are then associated with resources. A "computing resource," as used herein, refers to any resource now known or later developed that a consumer utilizes in servicing a workload, including without limitation processing resources (e.g., CPUs), data storage resources (e.g., memory, hard drive, etc.), communication resources (e.g., communication ports, bandwidth, etc.), and input/output (I/O) resources, as examples. Resources in a pool have capacity attributes, e.g., CPU, memory, I/O operation rates, and bandwidths, each with limited capacity.

To facilitate sharing of a resource pool's capacity between a plurality of consumers (e.g., a plurality of applications), some type of scheme for managing allocation of the pool's capacity among the consumers may be employed. Without such management of allocation, a given consumer may consume all or substantially all of the pool's capacity for servicing its workload, thus leaving the remaining consumers with insufficient capacity for supporting their respective workloads. Accordingly, consumers generally desire some assurance that they will be allocated sufficient capacity of the resource pool to enable the consumers to satisfy their respective quality of service (QoS) goals. As discussed further below, workload managers may configure schedulers to allocate capacity of a resource pool among the consumers in an attempt to manage such allocation in a manner that provides some assurance that the consumers can satisfy their QoS goals (e.g., by balancing allocation among the consumers).

When managing resource pools, application workloads may be assigned to resource containers that are then associated with resources in the pool. Management may occur at several different timescales. Long-term management corresponds to capacity planning and takes place over many months. Over a medium-timescale, e.g. days or months, groups of resource containers are found that are expected to share resources well. These containers are then assigned to their corresponding resources. Capacity management tools can be used to automate such a process. Once resource containers are assigned to a resource, a workload manager for the resource governs access to resource capacity over short time scales, e.g. 15 seconds. A workload manager can provide static allocations of capacity or change the per-resource container allocations based on time-varying workload demand.

Each resource in a pool may have a scheduler that monitors its workloads' demands and dynamically varies the allocation of capacity, e.g., CPU, to the workloads, thereby managing the utilization of the resources by the various consumers. For instance, the scheduler may dynamically vary allocation of the pool's capacity in a manner that attempts to provide each consumer with access only to the capacity it needs (for servicing its current workload). As a workload's demand increases, the scheduler may increase the amount of the resource pool's capacity that is allocated to such workload; and as a workload's demand decreases, the scheduler may decrease its allocation of the resource pool's capacity to such workload.

A workload manager may utilize several control parameters for controlling a scheduler's scheduling of resource capacity. Various schedulers are known, including without limitation proportional-share schedulers and weighted proportional-share schedulers. As these and other schedulers are well known, operation of an exemplary scheduler is only briefly described herein so as not to detract attention from the inventive concepts presented herein. The control parameters for a scheduler may include the following parameters for each workload: a gain parameter that affects how quickly the workload's allocation increases or decreases based on its current demand, a minimum CPU allocation (minCPU allocation) parameter that defines a minimum allocation of CPU for the workload even in the absence of demand, a maximum CPU allocation (maxCPU allocation) parameter that defines a maximum allocation of CPU for the workload, a lower allocation utilization threshold (lowerAllocUtil threshold) that defines a threshold amount which if the measured utilization of allocation for the workload for a previous schedule interval drops below then the allocation to the workload is decreased by the scheduler based on the gain parameter (but not below the minCPU allocation amount), and an upper allocation utilization threshold (upperAllocUtil threshold) that defines a threshold amount which if the measured utilization of allocation for the workload for a previous schedule interval exceeds then the allocation to the workload is increased by the scheduler based on the gain parameter (but not above the maxCPU allocation amount). The control parameters may be set to values that attempt to strike a balance between allocating sufficient resource capacity to a given workload to satisfy the consumer's quality of service (QoS) goals and also enabling resource capacity for satisfying the QoS desires for other workloads that share the resources. From a given consumer's point of view, having maximum capacity allocated to it may be desirable because that ensures that the consumer has the maximum capacity available from the resource pool for servicing its workload. From a resource pool manager's point of view, however, it is often desirable to limit the amount of capacity allocated to each consumer, as this allows more cost effective utilization of the pool's resources by enabling greater capacity that is available to be used by other consumers. Thus, a balance may be struck in which a certain amount of capacity is allocated to a consumer that is believed to be sufficient to satisfy the consumer's quality of service (QoS) goals, while permitting remaining capacity to be allocated to other consumers. The scheduler for a resource pool may be configured (e.g., via the above-mentioned control parameters) to manage the allocation of the resource pool's capacity to consumers in a manner that achieves such a balance in accordance with a desired resource management strategy.

Difficulty arises in determining optimal scheduler parameter settings that should be set by a workload manager. Further, difficulty arises in evaluating performance of workload managers in setting scheduler parameter settings. Traditional techniques have failed to evaluate a workload (or expected workload) that has its access to shared resources managed by a workload manager to determine the nature of the workload, such as its burstiness, and the corresponding impact that the nature of the workload will have on the performance of the workload manager. Thus, a desire exists for a metric that may be employed by systems and methods for determining the nature of a workload and evaluating the impact that such workload has on performance of a workload manager under consideration (e.g., to evaluate control parameters set for a scheduler and/or to determine optimal control parameters to be set for the scheduler).

BRIEF DESCRIPTION OF THE DRAWINGS

FIG. 7 shows an exemplary system according to one embodiment of the present invention;

DETAILED DESCRIPTION

Figure 1:
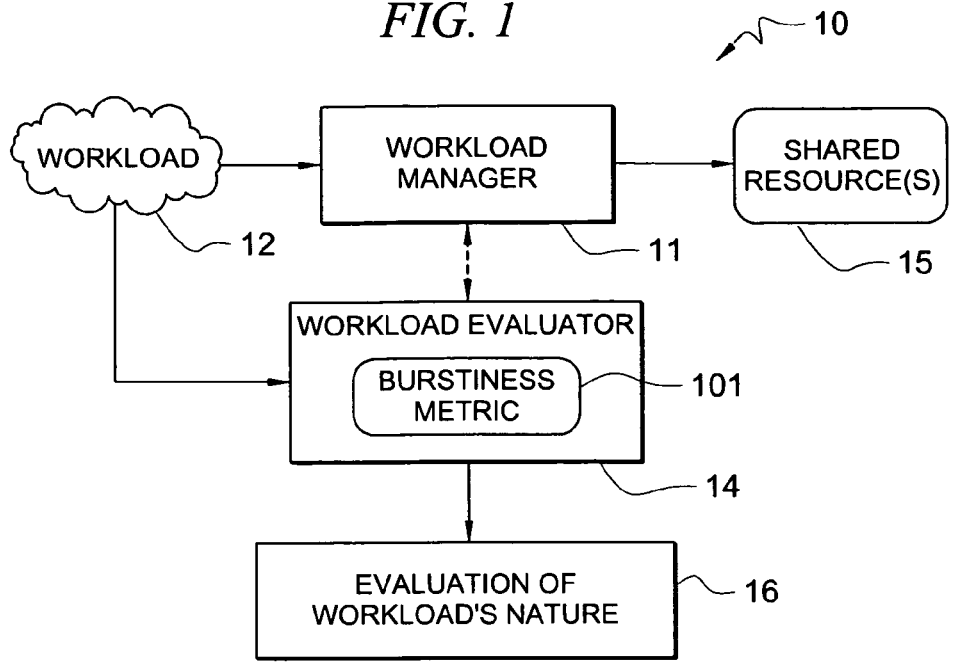
FIG. 1 shows an exemplary system according to one embodiment of the present invention.

FIG. 1 shows an exemplary system 10 according to one embodiment of the present invention. As shown, system 10 includes a workload manager 11 that is operable to manage access by workload 12 (e.g., application workloads) to capacity of shared resources 15, which may be resources in a resource pool. Shared resources 15 may be any type of computing resource that a consumer utilizes in servicing a workload, including without limitation processing resources (e.g., CPUs), data storage resources (e.g., memory, hard drive, etc.), communication resources (e.g., communication ports, bandwidth, etc.), and input/output (I/O) resources, as examples. Such shared resources 15 have capacity attributes, e.g., CPU, memory, I/O operation rates, and bandwidths, each with limited capacity. Thus, workload manager 11 manages access of competing consumer workloads 12 to such limited resource capacity. That is, workload manager 11 manages access to shared resource(s) 15 for satisfying competing demands of workload(s) 12 for capacity of the shared resource(s) 15. In so doing, workload manager 11 may define control parameters for a scheduler, such as a proportional-share scheduler, which dictate a scheduling scheme to be employed by such scheduler for scheduling access by competing consumer workloads to the shared resources 15. In certain embodiments, the scheduling scheme may be a dynamic scheme that varies depending on the respective demands of the competing workloads. In other embodiments, the scheduling scheme may be static.

In certain embodiments, workload 12 is an expected (e.g., historical, simulated, etc.) workload 12 for a given system. That is, workload 12 may be a representative workload of consumer(s) in a given system, which may be an actual historical workload collected for the consumer(s) or a synthetic workload generated to represent the workload of the consumer(s), as examples. Workload(s) 12 includes competing demands for access to shared resource(s) 15. In one embodiment, workload 12 includes data identifying various time periods and the corresponding demands for resource access (e.g., CPU utilization) desired by a consumer. For instance, workload 12 may comprise a sequence of timestamps (which may be 5 seconds apart, 5 minutes apart, etc., depending on the appropriate time granularity for the environment/resource) and the corresponding resource utilization (e.g., CPU, I/O, network, or other resource utilization) for each timestamp. Such workload 12 thus provides an estimation of the future workload expected for the consumer(s) of the system under evaluation. For instance, a historical workload of, say, 3 months of usage of the system's consumers, may provide a good estimation of a future workload expected to be incurred by the consumers. Thus, workload 12 comprises a plurality of competing workloads demanding access to the shared resource(s) 15 over time. In certain embodiments, workload manager 11 may be a simulated model of a workload manager under evaluation.

System 10 further includes a workload evaluator 14 that is operable to evaluate workload 12. As described further herein, the workload evaluator 14 is operable in certain embodiments to determine the nature of workload 12, including for example the burstiness of the workload 12. Workload evaluator 14 may be a software program stored to a computer-readable medium (e.g., memory, hard disk, optical disc, magnetic disk, or any other data storage device now known or later developed) and executing on a processor-based device, such as a personal computer (PC), laptop computer, server computer, etc. Of course, the functionality of workload evaluator 14 may be implemented in software, hardware, firmware, or any combination thereof. Thus, workload evaluator 14 may be employed as any type of evaluation logic, whether software, hardware, firmware, or any combination thereof.

In the example of FIG. 1, workload evaluator 14 employs a workload burstiness metric 101 for evaluating the burstiness of workload 12. Workload burstiness metric 101 may, for example, be used in a software application that is executing on a processor for evaluating the nature of workload 12. In general, "burstiness" refers to the amount of change in demand that occurs over short intervals of time (e.g., from one scheduling interval to a next scheduling interval). Thus, the larger a change in demand during such a short interval, the more bursty the workload is considered. Accordingly, in certain embodiments, the workload's burstiness corresponds to the degree to which demand for capacity of a shared resource varies from one scheduling interval to the next.

Workload evaluator 14 outputs an evaluation 16 of workload 12. Evaluation 16 may comprise various information about the nature of the workload 12, such as the determined burstiness of the workload. As described further herein, evaluation 16 may, in certain embodiments, be used to evaluate an expected workload 12 to determine the impact that the nature of the workload 12 (e.g., its burstiness) will have on the performance of a workload manager 11 (e.g., a simulated model of a workload manager 11). In certain embodiments, the evaluation 16 of workload 12 output by workload evaluator 14 may be used for evaluating the performance of workload manager 11 under such workload 12. Such evaluation 16 may be used, for example, by a workload manager evaluator to evaluate the performance of the workload manager 11 under the workload 12. In certain embodiments, the evaluation 16 (e.g., determined workload burstiness) may be used to aid a determination of certain control parameters to be set for the workload manager, such as the lowerAllocUtil threshold and upperAllocUtil threshold parameters described further below.

Thus, as described further herein, new workload evaluation metrics are provided by certain embodiments of the present invention, which may be used for aiding in determining the impact of a given workload on a workload manager under consideration and/or determining optimal workload manager parameter settings for such workload. Thus, in certain embodiments, the metrics may be used to guide the choice of appropriate (or optimal) parameter values for a workload manager to define for a scheduler in order to achieve a desirable level of application QoS, while minimizing usage of the shared resource(s) 15.

Figure 2:
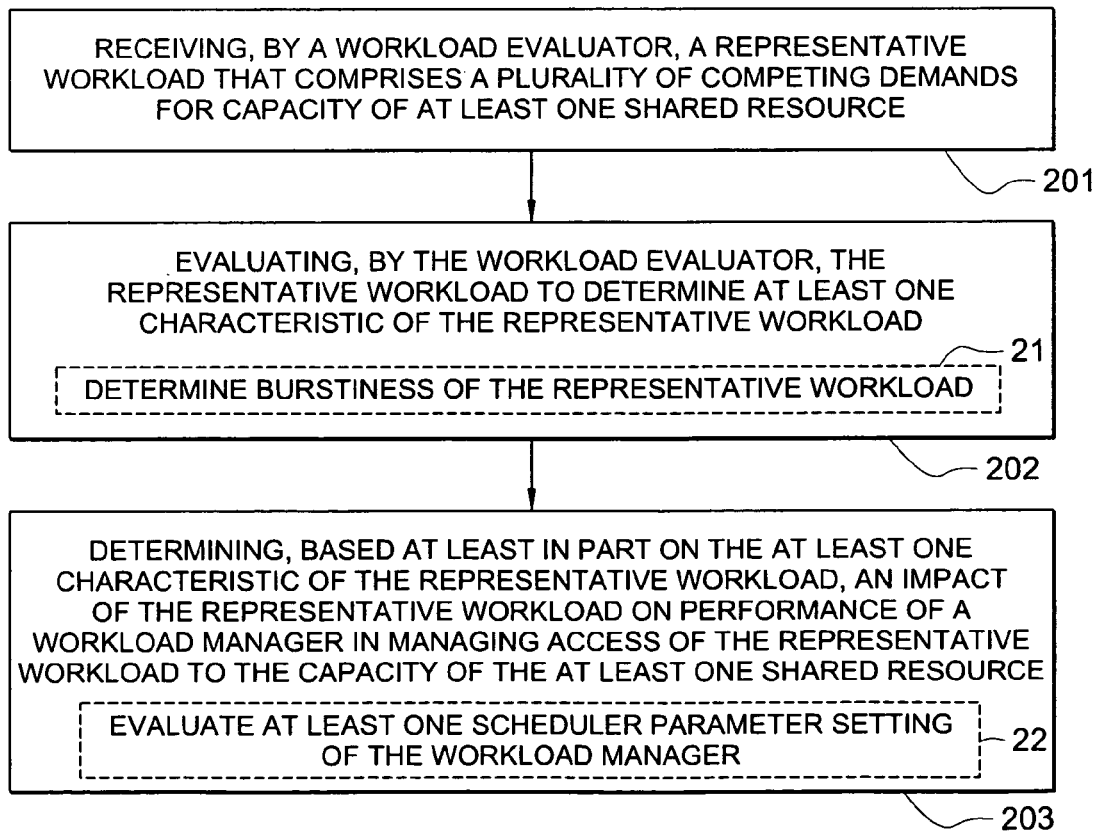
FIG. 2 shows an operational flow diagram for evaluating a workload according to certain embodiments of the present invention.

FIG. 2 shows an operational flow diagram for evaluating a workload according to certain embodiments of the present invention. In operational block 201, a workload evaluator (e.g., workload evaluator 14 of FIG. 1) receives a representative workload (e.g., workload 12 of FIG. 1) that comprises a plurality of competing demands for capacity of at least one shared resource (e.g., shared resource 15 of FIG. 1). In operational block 202, the workload evaluator evaluates the representative workload to determine at least one characteristic of the representative workload. As described further herein, in certain embodiments, the at least one characteristic is a characteristic that impacts performance of a workload manager. In certain embodiments, such at least one characteristic comprises a determined burstiness of the representative workload, as in operational block 21. In operational block 203, the at least one characteristic of the workload (e.g., its burstiness) determined in block 202, is used to determine an impact of the representative workload on performance of a workload manager in managing access of the representative workload to the capacity of the at least one shared resource. For example, in certain embodiments, at least one scheduler parameter setting of the workload manager, such as the lowerAllocUtil threshold and upperAllocUtil threshold parameters described further below, is evaluated, such as in operational block 22.

In certain embodiments, resource pools provide computing environments that offer virtualized access to shared resources, such as shared resources 15 of FIG. 1. Using the shared resources 15 of a pool effectively can rely on a combination of workload placement and workload management technologies. Workload management generally governs short-term access to resource capacity. For example, workload management may provide performance isolation within resource pools to ensure resource sharing even under high loads.

A workload manager, such as workload manager 11 of FIG. 1, can have a direct impact both on an application's overall resource access quality of service and on the number of workloads that can be assigned to a pool. This impact depends on the workload manager's parameter settings for a scheduler. Choosing an appropriate parameter setting for supporting application QoS is a challenging task.

As described further herein, the nature of a workload can impact the performance of a workload manager. Thus, the appropriate parameter settings of a workload manager depend, at least in part, on the nature of the workload that the workload manager manages. In certain embodiments of the present invention, a workload is analyzed to determine its demand variation. The demand variation is utilized for characterizing the workload's burstiness. According to certain embodiments, a model (e.g., computer-executable model) for measuring workload burstiness is provided. An embodiment of such model enables quantification of the impact of changing demands on the workload manager's performance (e.g., the impact on the workload manager's control algorithm). Thus, for instance, for a given workload manager 11 under evaluation, the model may be used for evaluating the impact that the burstiness of the expected workload 12 will have on the performance of the workload manager 11. Such evaluation of the workload manager 11 may aid in determining optimal parameter settings to be employed by the workload manager for improving its performance under the expected workload 12.

Exemplary Systems Employing a Workload Manager

Before describing embodiments of the present invention, such as the exemplary model for measuring workload burstiness, further, a brief description of an exemplary system to which embodiments of the present invention pertain is appropriate. Thus, an exemplary system for which embodiments of the present invention may be employed is described below with FIGS. 3-4. Such embodiments are merely exemplary for illustration of application of the concepts presented herein, and application of the concepts of the present invention are not intended to be limited to such exemplary embodiments. For instance, while an exemplary proportional-share scheduler and its corresponding control parameters are described below, embodiments of the present invention are not limited in application to such a proportional-share scheduler; but rather, the exemplary proportional-share scheduler provides a basis for discussion of various concepts of the present invention, which those of ordinary skill in the art will readily appreciate may be likewise employed for application to other types of schedulers.

Figure 3:
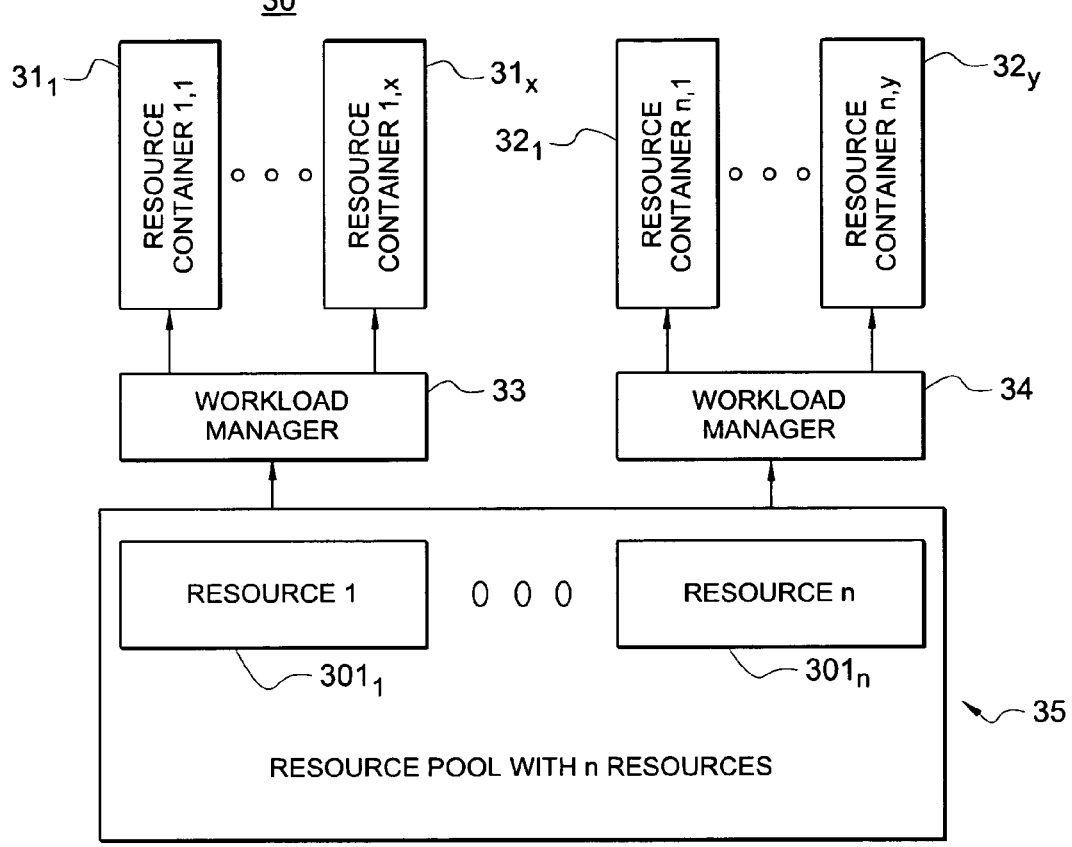
FIG. 3 shows an exemplary system illustrating the relationship between resource containers, workload managers, resources, and a resource pool according to one embodiment of the present invention.

FIG. 3 shows an exemplary system 30 illustrating the relationship between resource containers, workload managers, resources, and a resource pool according to one embodiment of the present invention. System 30 reflects an architecture commonly used for managing access to shared resources, such as is employed by the gWLM and WLM products available from Hewlett Packard Development Company, L.P. System 30 includes a resource pool 35 that includes a collection of resources $301_1$-$301_N$ (where N is any number), collectively referred to as resources 301. Such resources 301 may be any type of computing resources, such as clusters of servers or racks of blades, that offer shared access to computing capacity.

System 30 also includes resource containers $31_1$-$31_X$ (where X is any number), collectively referred to as resource containers 31, and resource containers $32_1$-$32_Y$ (where Y is any number), collectively referred to as resource containers 32. Resource containers 31 and 32 may be, as an example, virtual machines that are provided with access to shares of resource capacity (e.g., CPU, memory, input-output) via a scheduling scheme managed by workload managers 33 and 34, respectively. That is, in this example, workload manager 33 manages the scheduling of access by the workloads of resource containers 31 to the associated resources in pool 35, while workload manager 34 manages the scheduling of access by the workloads of resource containers 32 to the associated resources in pool 35. While two workload managers 33 and 34 with respective resource containers 31 and 32 are shown for ease of illustration in this example, those of ordinary skill in the art will recognize that any number of such workload managers may be so implemented in system 30. Further, any number of resource pools each comprising any number of resources therein may be employed in a given implementation of system 30. Additionally, any scheduling scheme now known or later developed may be employed by workload managers 33 and 34, such as employing known proportional-share schedulers or weighted proportional-share schedulers.

In this example, when managing a resource pool 35, application workloads are assigned to resource containers 31, 32 that are associated with resources 301 in the pool. For instance, in this example resource containers 31 are associated with resource(s) $301_1$, and resource containers 32 are associated with resource(s) $301_N$. In other words, the workloads assigned to resource container 31 are requesting access to certain resources $301_1$ that are pre-associated with resource container 31, and the workloads assigned to resource container 32 are requesting access to certain resources $301_N$ that are pre-associated with resource container 32. Thus, each of resource containers $31_1$-$31_X$ correspond to a separate workload that is competing for access to shared resource $301_1$.

Generally, management of the resource pool 35 may occur at several different timescales. Long-term management typically corresponds to capacity planning and may take place over several months. Over a medium timescale, e.g., days or months, groups of resource containers, such as containers 31 and 32 in FIG. 3, are found that are expected to share resources well. These containers are then assigned to their corresponding resources. For instance, resource containers 31 share access to resource(s) $301_1$, while resource containers 32 share access to resource(s) $301_N$ in this example. Capacity management tools can be used to automate such a process, or the assignment of containers to resources may be performed manually. Techniques now known or later developed may be employed for assigning workloads to a resource container and/or for associating resources with a container, and such techniques are thus not described further herein so as not to detract attention from the inventive concepts presented herein.

Once resource containers are assigned to a resource, a workload manager for the resource governs access to resource capacity over short timescales, e.g., 15 seconds or similar time intervals. Thus, workload manager 33 governs (or manages) access of workloads in containers 31 to computing capacity of resource $301_1$, while workload manager 34 governs (or manages) access of workloads in containers 32 to computing capacity of resource $301_N$, in this example. Each workload manager can provide static allocations of capacity or change the per resource container allocations based on time-varying workload demand.

Each resource container is associated with an entitled number of shares of an associated resource. For example, each of resource containers $31_1$-$31_X$ may be associated with an entitled number of shares of a CPU resource(s) $301_1$. The entitled number of shares correspond to an upper bound on the allocation of resources for the container. Workload manager 33 dynamically varies the allocation of shares to each resource container $31_1$-$31_X$ to permit a more efficient use of the shared resource(s) $301_1$. In one embodiment, the workload manager is layered upon a proportional-share scheduler; but embodiments of the present invention are not limited in application to such an implementation but may likewise be employed for other types of schedulers now known or later developed. An exemplary implementation of a proportional-share scheduler is described hereafter for illustrative purposes.

Figure 4:
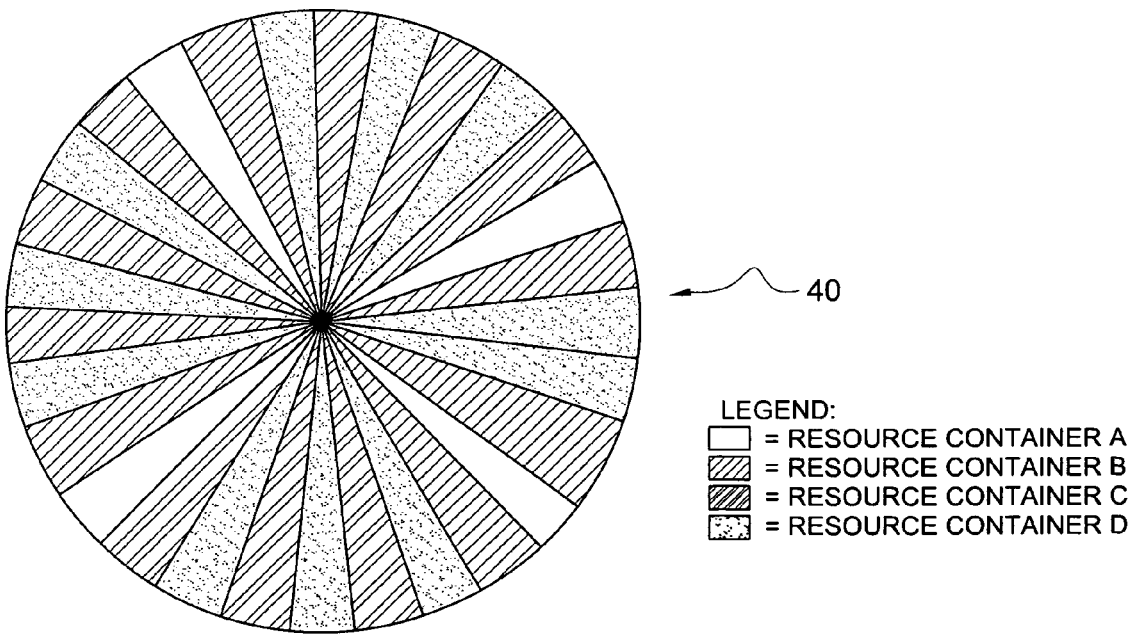
FIG. 4 shows an exemplary pie chart that illustrates a schedule for a proportional-share scheduler that supports several resource containers, according to one embodiment of the present invention.

The proportional-share scheduler utilized in one embodiment provides bounded access to resources for each resource container. The scheduler is configured to offer a share of a resource (e.g., a CPU resource). For instance, the scheduler may be configured to offer 10 millisecond (msec) CPU timeslices. Of course, timeslices may be offered according to some other time interval. FIG. 4 shows an exemplary pie chart 40 that illustrates a schedule for such a proportional-share scheduler that supports several resource containers, identified as resource containers "A", "B", "C", and "D", according to one embodiment of the present invention. Resource containers A-D may correspond to resource containers 31 or to resource containers 32 of FIG. 3, as examples. Each piece of the pie represents one timeslice. Similarly shaded slices correspond to the same resource container, as indicated in the accompanying legend of FIG. 4. With bounded access, the scheduler advances from slice to slice every 10 msec regardless of whether resources are used or not, i.e. it is a non-work-conserving scheduler. This provides for performance isolation. Each container receives its particular service rate regardless of whether any of the containers are using resources (i.e., regardless of the workload demands). Such isolation can be desirable in a shared resource environment for enterprise applications as it gives the appearance of dedicated access to resources. Adding new workloads (with corresponding new containers) to the pool has little impact on the performance behavior of workloads already in the pool.

The schedule is chosen to provide each resource container with access to its allocated shares. In this example, the scheduler spreads each resource container's shares as evenly as possible over the pie to deliver what may be perceived as a smooth service rate. Though the pie 40 illustrates a schedule for access to one CPU, a workload may be assigned shares from many CPUs (or other types of shared resources) such that its total allocation equals its number of shares. Workload schedulers may use heuristics to best match the offered concurrency over all CPUs with the level of concurrency a workload is able to exploit. However, when more CPUs are used, the service rate per-CPU diminishes and the per-CPU schedules may differ. In this exemplary embodiment, no assumption is made about whether the schedules for multiple CPUs are synchronized.

An inherent problem of a fixed schedule, i.e., fixed allocations, is that resources may not be used as efficiently as desired. In such an implementation, each resource container is sized to support its peak capacity requirements. That is, each resource container is allocated sufficient number of CPU timeslices to support its peak capacity requirements. Yet, most applications rarely need their peak amount. Workload managers aim to dynamically allocate the capacity associated with resource containers to facilitate resource sharing. As mentioned above, the workload manager (e.g., workload managers 33 and 34 of FIG. 3) considered in one exemplary embodiment is layered on top of a proportional-share scheduler and dynamically adjusts the allocation of each resource container based upon the current demands of the resource container. For example, if a workload of a given resource container goes idle, then its allocation can be reduced (e.g., the number of timeslices allocated to such container in pie 40 of FIG. 4 may be reduced); and if the workload becomes very busy, then its allocation can be increased (e.g., the number of timeslices allocated to such container in pie 40 of FIG. 4 may be increased). The workload manager may define control parameters that control such dynamic reallocation by the scheduler, as discussed further below.

Adjusting the allocation of resource capacity to containers based on demand permits statistical multiplexing within a resource pool. For ease of discussion, such multiplexing is not considered in this embodiment. Analysis of this exemplary embodiment of a scheduler assumes that each workload gets access to capacity according to its demands and the allocation decisions of the workload manager algorithm. The analysis is with respect to a workload within its resource container.

The workload managers 33 and 34 considered in this exemplary embodiment each corresponds to a negative feedback controller. Each workload manager has several control parameters, including the following control parameters:

schedule interval is a parameter that is applied for all workloads managed by the workload manager. The workload manager computes a new schedule for the proportional-share scheduler at the end of each schedule interval;

gain—a parameter that affects how quickly a workload's allocation increases or decreases based on its current demand;

minCPU allocation—a minimum allocation amount, i.e. even in the absence of demand, the allocation cannot go lower than minCPU amount;

maxCPU allocation—maximum allocation amount for the workload;

lowerAllocUtil threshold—a parameter that triggers a decrease of the allocation, i.e. if the measured utilization of allocation for a workload for the previous schedule interval drops below the lower AllocUtil value, then the allocation is decreased based on the gain value, but it never goes below the minCPU allocation amount; and upperAllocUtil threshold—a parameter that triggers an increase of the allocation, i.e. if a utilization of allocation goes above the upperAllocUtil then the allocation is increased based on the gain value, but it can not go higher than maxCPU allocation amount.

In operation of this exemplary scheduler, the allocation (e.g., of CPU timeslices to a given workload) does not change when utilization of allocation for such workload falls within the range lowerAllocUtil and upperAllocUtil. Further, the allocation never goes out of the range minCPU allocation and maxCPU allocation. These conditions help to avoid hysteresis, limit the impact of one workload on others, and ensure resource access quality of service when a workload is transitioning from an idle to busy period. Note that for this exemplary embodiment: $0 \leq lowerAllocUtil \leq upperAllocUtil \leq 1$. It should be further noted that while this exemplary embodiment is described for a CPU resource, the concepts may be likewise applied to other shared resources. Thus, for instance, the minCPU allocation and maxCPU allocation parameters may be referred to generically as "minResource allocation" and "maxResource allocation" for defining the minimum and maximum allocation amounts of any shared resource.

According to one embodiment, there are two parameters in the above set of identified control parameters that are closely related to desired application performance, and are typically set by the customers of the applications:

A) lowerAllocUtil threshold, which defines a utilization of allocation that supports ideal application performance. Clearly, the utilization of allocation lower than Chow also supports the ideal application performance, however at a price of underutilized (over-allocated) resources.

B) upperAllocUtil threshold, which defines a threshold on utilization of allocation beyond which the application performance would be undesirable to users. The other control parameters, such as gain, minCPU allocation, and maxCPU allocation, are typically tuned by the workload manager in attempt to best support application performance.

As described further below, certain embodiments of the present invention enable an analysis of the workload (e.g., the workload's burstiness) to aid in evaluating certain parameters of a workload manager, such as the lowerAllocUtil threshold. Accordingly, certain embodiments of the present invention take into consideration the expected workload to be handled by a workload manager in order to aid a user in evaluating performance of the workload manager for various values that may be set for the lowerAllocUtil threshold, and thus aids the user in determining the optimal value to be set for the lowerAllocUtil threshold. As described further herein, the appropriate value to be set for the lowerAllocUtil threshold parameter may differ greatly depending on the determined nature of the expected workload being presented to the workload manager.

A workload manager, such as workload manager 11 of FIG. 1, may be modeled by a simulation model. An exemplary simulation model of a workload manager that may be employed in certain embodiments is described below. Of course, other simulation models for modeling a given workload manager to be evaluated may be similarly employed in other embodiments. The exemplary simulation model uses the following notation:

i—the current time interval;

$D_i^{new}$—a new incoming workload demand in interval i; and $D_i^{carry\_forw}$ the portion of demand that that was not satisfied in interval i−1 and is therefore carried forward to interval i. For each time interval, $D_i^{carry\_forw}$ is computed according to the following formula: $D_i^{carry\_forw} = \max(D_{i-1} - A_{i-1}, 0)$;

$D_i$—the total demand in interval i, where $D_i = D_i^{new} + D_i^{carry\_forw}$; and $A_i$—the allocation provided by the controller in time interval i.

At the end of interval i, the workload manager computes a new allocation $A_{i+1}$ for the workload for interval i+1 using the following policies:

1. If lowerAllocUtil$\leq D_i/A_i \leq$upperAllocUtil then there is no change in the allocation, and $A_{i+1}=A_i$.
2. If $D_i/A_i \leq$lowerAllocUtil then the controller attempts to decrease the next interval allocation:

$$A_{i+1} = A_i - \text{gain} \times \left(A_i - \frac{D_i}{lowerAllocUtil}\right).$$

If $A_{i+1} \leq$minCPU then $A_{i+1}$=minCPU

3. If upperAllocUtil$\leq D_i/A_i$ then the controller attempts to increase the next step allocation:

$$A_{i+1} = A_i + \text{gain} \times \left(\frac{D_i}{upperAllocUtil} - A_i\right).$$

If maxCPU$\leq A_{i+1}$ then $A_{i+1}$=maxCPU.

The workload manager takes the computed allocations for each workload's resource container and associates them with a schedule, i.e., for time interval i+1. The proportional-share scheduler then serves short timeslices, such as those shown in FIG. 4, according to the schedule until the end of the interval.

Since allocation cannot go lower than minCPU amount, it may be tempting to set such an allocation to a very small value. However, in this case, it may take several schedule intervals to increase an allocation to a correct size when there is a burst of incoming demand. This may present a resource access quality of service issue for interactive workloads with infrequent bursts of requests, as the requests that start the bursts may incur long response times before the scheduler properly reallocates the shared resource capacity over many scheduling intervals.

The choice of lower and upper utilization of allocation thresholds is based on the responsiveness requirements and arrival process of a workload. The greater the burstiness in arrivals, and the greater the responsiveness requirements, the lower the acceptable utilization of allocation. This is because utilization of allocation is measured over an interval, e.g., 15 seconds, so it conceals the bursts of demand within the interval. For this reason, resource allocations are typically larger than resource demands. This limits the potential utilization of resources in a resource pool. Accordingly, understanding the burstiness of an expected workload may aid in determining the appropriate parameter settings of a workload manager to enable provision of a desired QoS while maintaining efficient resource utilization (i.e., minimizing any unnecessary overallocation of resource capacity).

Determining an appropriate utilization of allocation range can be either a categorical or empirical exercise. A categorical approach could consider several classes of service, each associated with a range. Each workload may be assigned to one of the classes based on business need. The highest quality class may represent business critical where high response times may affect the revenue or image of the business. The lowest class may be for workloads where higher response times have no significant business impact. An exemplary technique for determining different classes of service to be assigned to the competing workloads is described further in co-pending and commonly assigned U.S. patent application Ser. No. 11/134,681 filed May 19, 2005 titled "SYSTEM AND METHOD FOR DETERMINING A PARTITION OF A CONSUMER'S RESOURCE ACCESS DEMANDS BETWEEN A PLURALITY OF DIFFERENT CLASSES OF SERVICE," the disclosure of which is hereby incorporated herein by reference. An empirical exercise for a specific application would look at its arrival and service time processes to determine a utilization of allocation range that satisfies application-specific response time requirements.

Exemplary Workload Manager Evaluation Metrics

As discussed further in concurrently filed and commonly assigned U.S. patent application Ser. No. 11/489,968 titled "SYSTEM AND METHOD FOR EVALUATING PERFORMANCE OF A WORKLOAD MANAGER", the disclosure of which is incorporated herein by reference, in certain embodiments a workload manager evaluation metric may be used for evaluating a workload manager's performance (e.g., performance of workload manager 11 of FIG. 1), such as for measuring resource usage efficiency and resource access QoS. According to one embodiment, such a workload manager evaluation metric may be determined as described further hereafter. That is, according to one embodiment, exemplary metrics for measuring resource access quality of service are defined. In this embodiment, the operational measures, such as measurement of resource usage efficiency and resource access QoS, are computed by a workload manager evaluator over a representative time period for a workload's demands, e.g., hours or months. Such a workload manager evaluator may be a software program stored to a computer-readable medium (e.g., memory, hard disk, optical disc, magnetic disk, or any other data storage device now known or later developed) and executing on a processor-based device, such as a personal computer (PC), laptop computer, server computer, etc. Of course, the functionality of the workload evaluator may be implemented in software, hardware, firmware, or any combination thereof.

According to one embodiment, the original workload and its demands are characterized as a trace of CPU demand values for the time period, with one CPU demand value per schedule interval. Values for the metrics are computed with respect to a particular set of workload manager control parameters by replaying the trace through the simulation model of workload manager control algorithm.

Resource access quality of service (QoS) is defined in one embodiment using the metric QoS satisfied demand $Q^D$. This is the portion of total demand that is satisfied in intervals that have utilization of allocation less than or equal to upperAllocUtil $Q^D$ may be defined as follows:

$$Q^D = \sum_{i=1}^{i=T} D_i, \text{ such that } \frac{D_i}{A_i} \leq upperAllocUtil.$$

For metric $Q^D$, the percentage of the time intervals that satisfy the respective requirement $$\left(\text{i.e., the } \frac{D_i}{A_i} \leq upperAllocUtil \text{ requirement}\right)$$

are tracked as metric $Q^P$. These metrics bring additional perception of time for characterizing resource access quality of service. For example, the $Q^P$ metric reflects the percentage of time intervals (amount of time) during which QoS satisfied access to CPU capacity is provided. In one exemplary embodiment, these metrics have values between 0 and 1, and the values are not normalized. Further details about these and other metrics that may be employed for evaluating the performance of a workload manager are described further in concurrently filed and commonly assigned U.S. patent application Ser. No. 11/489,968 titled "SYSTEM AND METHOD FOR EVALUATING PERFORMANCE OF A WORKLOAD MANAGER", the disclosure of which is incorporated herein by reference.

In general, metrics from within an application's context, such as response times, are hard to obtain. Thus, in certain embodiments, the resource usage based metrics are used as measures of application workload quality of service. The metrics may be used to determine how well the workload manager under evaluation is providing access to capacity of a shared resource in proportion to a workload's needs/demands.

Exemplary Embodiments for Evaluating a Workload

Exemplary embodiments of the present invention for determining workload burstiness and its impact on the performance of a workload manager are described further below. While the exemplary embodiments described below reference aspects of the above-described exemplary system and workload manager evaluation metrics, the scope of the present invention is not intended to be limited by the above-described exemplary system and workload manager evaluation metrics. Rather, the above system and workload manager evaluation metrics provide examples for context to aid a reader in better appreciating the following details regarding certain embodiments of the present invention. That is, details for enabling certain embodiments of the present invention can be better understood in view of the above discussion of an exemplary system (e.g., exemplary proportional-share scheduler and modeled workload manager) and workload manager evaluation metrics.

As described further below, certain embodiments of the present invention enable an analysis of the workload (e.g., the workload's burstiness) to aid in evaluating certain parameters of a workload manager, such as the lowerAllocUtil threshold. Accordingly, certain embodiments of the present invention take into consideration the expected workload to be handled by a workload manager in order to aid a user in evaluating performance of the workload manager for various values that may be set for the lowerAllocUtil threshold, and thus aids the user in determining the optimal value to be set for the lowerAllocUtil threshold. As described further herein, the appropriate value to be set for the lowerAllocUtil threshold parameter may differ greatly depending on the determined nature of the expected workload being presented to the workload manager.

In order to quantify and characterize the degree of burstiness of a given workload, one embodiment of the present invention employs a model (e.g., a computer-executable model) described further hereafter. There are a few parameters in this exemplary model:

minCPU allocation—a minimum allocation amount by the workload manager, i.e. even in the absence of demand, the allocation cannot go lower than minCPU amount. This is a scheduler parameter setting of the workload manager, as defined above. As also described above, a maxCPU allocation parameter may likewise be defined, which specifies a maximum allocation amount of the shared resources (e.g., CPU) that the workload manager will allocate to a given application demanding access to the shared resource.

demand_variation—sets a limit on a ratio in successive demands (i.e., demands made in successive scheduling intervals) that is of interest. For example, setting demand_variation=2 enables answering a question: what is a percentage of successive demands with increase in demand of less than 2 times?

Demand_minCPU—a threshold that sets a boundary for demands of interest. That is, Demand_minCPU sets a threshold that aids in identifying those demands in a workload that are of interest in evaluating the burstiness of the workload. In this embodiment, Demand_minCPU is defined as:

$$\text{Demand\_minCPU} = \frac{\text{minCPU allocation}}{\text{demand\_variation}}$$

Intuitively, variation in demands that are smaller than Demand_minCPU are not of interest. That is, if there are demands in a workload that are smaller than Demand_minCPU value, variation of those demands are not of interest in the analysis in this exemplary embodiment.

It should be noted that while this exemplary embodiment is described for a CPU resource, the concepts may be likewise applied to other shared resources. Thus, for instance, the minCPU allocation and Demand_minCPU parameters may be referred to generically as "minResource allocation" and "Demand_minResource", and may apply to any other shared resources for which a workload under evaluation includes competing demands for capacity.

In this embodiment, a degree of workload burstiness, $B^D$, is computed using the following metric:

$$B^D = \frac{\sum_{i=0}^{i=T} D_i}{D} \text{ such that } \frac{\max(\text{Demand\_minCPU}, D_i)}{\max(\text{Demand\_minCPU}, D_{i-1})} \leq \text{demand\_variation}.$$

The $B^D$ metric thus provides a measurement of the percentage of successive demands that have an increase in demand less than specified demand_variation. Thus, the higher the $B^D$ percentage, the less bursty the workload under evaluation is; while the lower the $B^D$ percentage, the more bursty the workload under evaluation is.

In one embodiment, for metric $B^D$, the percentage of the time intervals that satisfy the respective requirement of $$\frac{\max(\text{Demand\_minCPU}, D_i)}{\max(\text{Demand\_minCPU}, D_{i-1})} \leq \text{demand\_variation}$$

are tracked as metric $B^P$. That is, $B^P$ reflects the percentage of time intervals in a given workload under analysis that have an increase in demand less than or equal to demand_variation.

In certain embodiments, the above exemplary model is used to derive upper bound estimates for the above-described QoS metrics $Q^D$ and $Q^P$ for a given workload. Thus, such model can be used for determining the upper bound estimates for $Q^D$ and $Q^P$ for the given workload without running a detailed simulation analysis of a workload manager in the manner described for computing the $Q^D$ and $Q^P$ metrics above.

The demand_variation parameter corresponds to how large the ratio can be in successive demands $D_i$ and $D_{i+1}$ in order that $D_{i+1}$ can be served by a workload manager within the existing allocation $A_i$, and within the utilization bounds lowerAllocUtil and upperAllocUtil that define the desirable QoS target. Thus, in one embodiment, the value of demand_variation is defined in the following way:

$$\text{demand\_variation} = \frac{upperAllocUtil}{lowerAllocUtil}.$$

Consider the following case: let $A_i$ be the current allocation, and let $$lowerAllocUtil \leq \frac{D_i}{A_i} \leq upperAllocUtil.$$

In this exemplary case, the workload manager will keep the next interval allocation $A_{i+1}$ unchanged, i.e. for the next $i+1$ interval $A_{i+1}=A_i$. If $D_i/D_{i+1}>$demand_variation, then $D_{i+1}/A_{i+1}>$upperAllocUtil, i.e. the demand $D_{i+1}$ will not be a QoS satisfied demand, and this condition will cause an increase in the allocation by the workload manager (i.e., the workload manager's control algorithm) at the next step (or interval). In other words, when the demand of an application for a next scheduling interval ($D_{i+1}$) increases above its demand for the current scheduling interval ($D_i$) by more than demand_variation, then the demand for the next scheduling interval ($D_{i+1}$) divided by the amount of capacity allocated by the scheduler to such application during the next scheduling interval ($A_{i+1}$) is greater the upperAllocUtil threshold parameter; and thus the demand $D_{i+1}$ will not be a QoS satisfied demand. Because $$\text{demand\_variation} = \frac{upperAllocUtil}{lowerAllocUtil}$$

in this exemplary embodiment, whenever $D_i/D_{i+1}>$demand_variation (i.e., $$\frac{D_i}{D_{i+1}} > \frac{upperAllocUtil}{lowerAllocUtil}\bigg), \text{ then } \frac{D_{i+1}}{A_{i+1}} > upperAllocUtil.$$

This somewhat reflects an association of $D_i$ with lowerAllocUtil under the given allocation $A_i$, and $D_{i+1}$ with the upperAllocUtil of a given allocation $A_i$. Thus, in this exemplary embodiment, when $$\frac{D_i}{D_{i+1}} > \frac{upperAllocUtil}{lowerAllocUtil},$$

then it is guaranteed that $$\frac{D_{i+1}}{A_{i+1}} > upperAllocUtil.$$

Thus, the $B^D$ and $B^P$ metrics set the upper limit for achievable QoS metrics $Q^D$ and $Q^P$ that can be supported by the workload manager under the corresponding parameter values of minCPU, lowerAllocUtil and upperAllocUtil. (We consider gain=1 in this reasoning). To further illustrate, consider a situation in which Di with respect to the allocation Ai corresponds to the utilization in the middle of the allocation thresholds (lowerAllocUtil, upperAllocUtil); in this situation, in spite of $$\frac{D_i}{D_{i+1}} < \frac{upperAllocUtil}{lowerAllocUtil},$$

there may be a case that $$\frac{D_{i+1}}{A_{i+1}} > upperAllocUtil.$$

This is why $B^D$ is an upper limit (bound) for QoS metric $Q^D$, and correspondingly $B^P$ is an upper limit for QoS metric $Q^P$. Accordingly, the best possible $Q^D$ and $Q^P$ metrics that can be achieved for a workload manager under a representative workload can be estimated from the workload evaluation metrics (e.g., burstiness metrics) $B^D$ and $B^P$.

Figure 5:
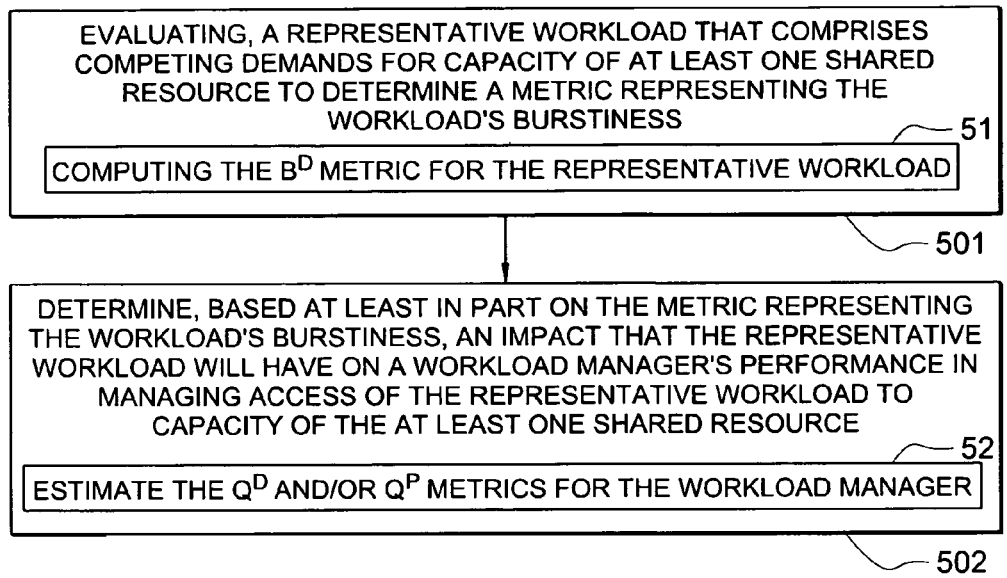
FIG. 5 shows an exemplary operational flow according to one embodiment of the present invention.

Turning to FIG. 5, an exemplary operational flow according to one embodiment of the present invention is shown. In operational block 501, a representative workload 12 that comprises competing demands for capacity of at least one shared resource 15 is evaluated (by workload evaluator 14) to determine a metric representing the workload's burstiness. In certain embodiments, as shown in block 51, the above-described metric $B^D$ is computed to represent the degree of burstiness of the representative workload. In block 502, an impact that the representative workload 12 will have on the performance of a workload manager 11 in managing access of the representative workload 12 to capacity of the at least one shared resource 15 is determined (e.g., by the workload evaluator 14) based at least in part on the determined metric representing the workload's burstiness. In certain embodiments, as shown in block 52, the determined metric representing the workload's burstiness is used to estimate the $Q^D$ and/or $Q^P$ metrics for the workload manager. Thus, a metric representing the workload's burstiness may be determined and used to estimate the quality of service of a workload manager in managing access of the representative workload 12 to capacity of the at least one shared resource 15.

Figure 6:
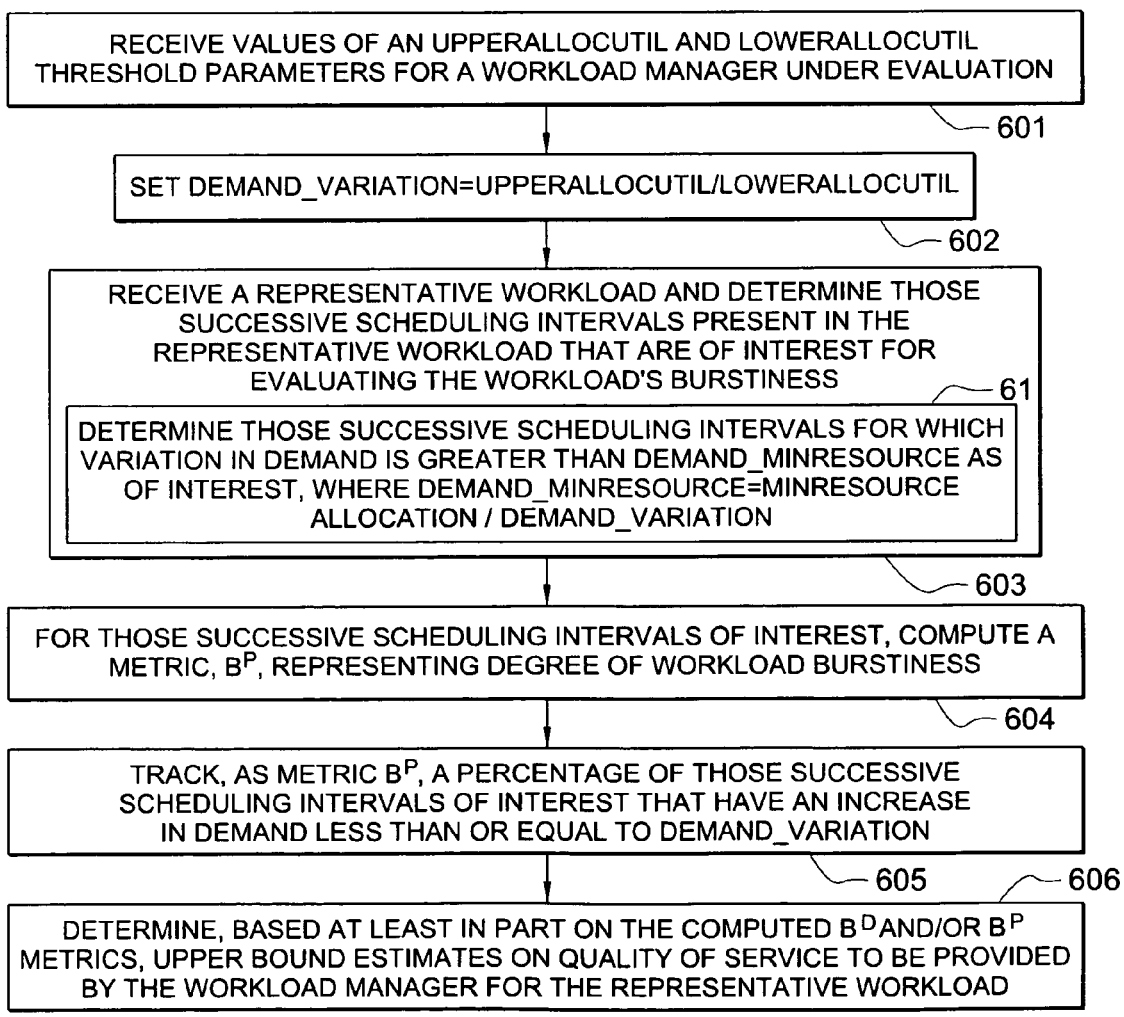
FIG. 6 shows another exemplary operational flow according to one embodiment of the present invention.

FIG. 6 shows another exemplary operational flow according to one embodiment of the present invention. In this exemplary embodiment, a workload evaluator 14 receives, in operational block 601, values of upperAllocUtil and lowerAllocUtil threshold parameters for a workload manager 11 under evaluation. The workload evaluator 14 sets a variable $$\text{demand\_variation} = \frac{upperAllocUtil}{lowerAllocUtil}$$

in block 602. In block 603, the workload evaluator 14 receives a representative workload 12 and determines those successive scheduling intervals present in the representative workload that are of interest for evaluating the workload's burstiness. In certain embodiments, as shown in block 61, the workload evaluator 14 determines those successive scheduling intervals for which variation in demand is greater than Demand_minResource (e.g., Demand_minCPU when the shared resource is CPU) as being of interest, where Demand_minResource=minResource allocation/demand_variation.

In block 604, the workload evaluator 14 computes, for those successive scheduling intervals determined in block 603 to be of interest, a metric $B^D$ representing degree of burstiness of the representative workload. Such $B^D$ metric may be computed as described above. In block 605, the workload evaluator 14 tracks, as metric $B^P$, a percentage of those successive scheduling intervals of interest that have an increase in demand less than or equal to demand_variation. In block 606, the workload evaluator 14 may further determine, based at least in part on the computed $B^D$ and/or $B^P$ metrics, upper bound estimates on quality of service to be provided by the workload manager 11 for the representative workload 12. For example, as discussed above, the upper bounds of $Q^D$ and/or $Q^P$ metrics may be estimated from the computed $B^D$ and/or $B^P$ metrics.

In certain embodiments, the above process may be repeated for various different values of lowerAllocUtil and/or upperAllocUtil parameters to determine optimal values of such parameters to employ for the workload manager 11. In certain embodiments, once the lowerAllocUtil and/or upperAllocUtil parameters are set, a workload manager evaluator may be used to determine optimal values of other control parameters, such as minCPU allocation and maxCPU allocation, to employ for a workload manager, as described further in concurrently filed and commonly assigned U.S. patent application Ser. No. 11/489,968 titled "SYSTEM AND METHOD FOR EVALUATING PERFORMANCE OF A WORKLOAD MANAGER", the disclosure of which is incorporated herein by reference.

FIG. 7 shows an exemplary system 70 according to one embodiment of the present invention. System 70 includes a workload manager 11, shared resources 15, and workload evaluator 14. As discussed above with FIG. 1, workload evaluator 14 is operable to receive a representative workload 12 and determine an evaluation 16 of the workload's nature (e.g., the workload's degree of burstiness). Further, in this example, a workload manager evaluator 71 is also included, which is operable to evaluate the performance of workload manager 11 under the representative workload 12. Workload manager evaluator 71 employs a workload manager evaluation metric 701 for evaluating the performance of workload manager 11 under workload 12. Workload manager evaluation metric 701 may, for example, be used in a software application that is executing on a processor for evaluating performance of workload manager 11 under workload 12. In certain embodiments, the workload manager evaluator 71 employs workload manager evaluation metric 701 to evaluate one or more control parameter settings of a scheduler. Thus, workload manager evaluator 71 outputs an evaluation workload manager performance evaluation 72 of workload manager 11 under workload 12. Evaluation 72 may comprise various information about the performance of workload manager 11 (e.g., with one or more defined scheduler control parameters), such as usage efficiency evaluation 702 and QoS evaluation 703. Further details regarding an exemplary implementation of workload manager evaluator 71 according to one embodiment are described in concurrently filed and commonly assigned U.S. patent application Ser. No. 11/489, 968 titled "SYSTEM AND METHOD FOR EVALUATING PERFORMANCE OF A WORKLOAD MANAGER", the disclosure of which is incorporated herein by reference.

In this example, the evaluation 16 of a workload's burstiness may be input to a workload manager evaluator 71 to aid the workload manager evaluator 71 in evaluating workload manager 11. For instance, as described above, the burstiness metrics $B^D$ and/or $B^P$ may be used to estimate the upper bounds on the quality of service metrics $Q^D$ and/or $Q^P$. Further, in certain embodiments, the burstiness metrics determined by the workload evaluator 14 may be used to determine an appropriate lowerAllocUtil and/or upperAllocUtil threshold parameter for a workload manager 11. For instance, various different values of lowerAllocUtil and/or upperAllocUtil threshold parameters may be evaluated by the workload evaluator 14 to estimate the upper bounds on the quality of service metrics $Q^D$ and/or $Q^P$ for each of such various values to determine the optimal set of values for these parameters. Thereafter, such optimal set of values for the lowerAllocUtil and upperAllocUtil threshold parameters may be set, and the workload manager evaluator 71 may then determine the optimal values for other parameter settings, such as minCPU allocation and maxCPU allocation.

Exemplary Case Study

To illustrate an exemplary application of one embodiment using the above-described workload burstiness metrics, consider the following case study. The following case study is intended solely as an example and is not intended to limit the scope of the concepts presented herein. For this study, we obtained a trace of CPU demands for a file server from a software development environment that is to be hosted in a resource pool. This is the "reference system" for our case study. The trace was recorded over 140 days and includes a measurement of CPU utilization every 15 seconds. The file server had fixed access to 3 CPUs and was not governed by a workload manager.

Figure 8A:
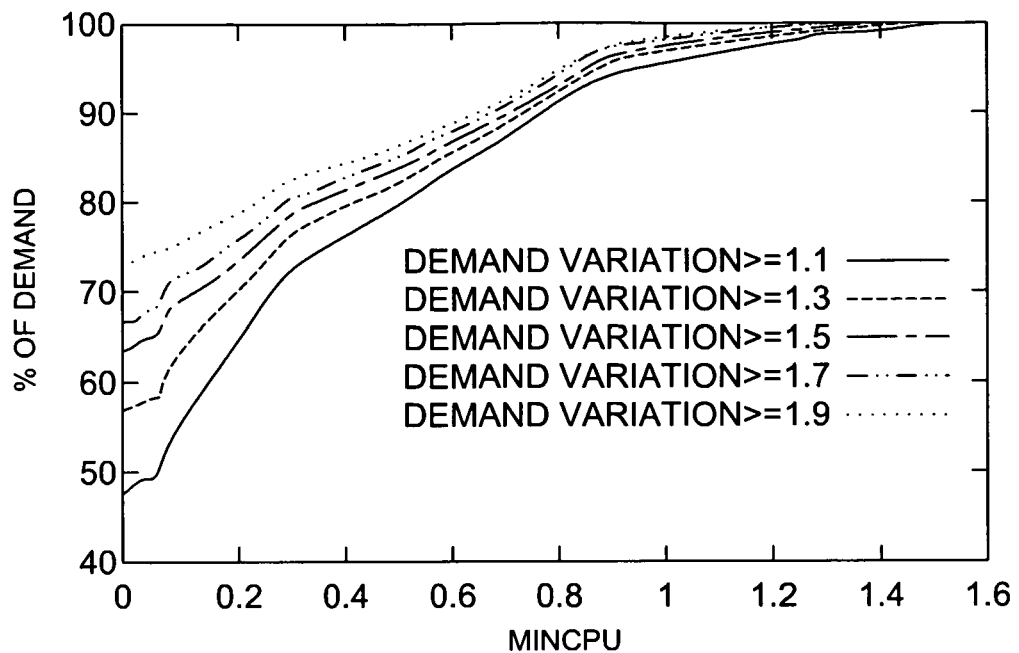
FIGS. 8A-8B show graphs illustrating the percentage of intervals and demands that fall in intervals with demand variation less than specific thresholds, respectively, for an exemplary case study.
Figure 8B:
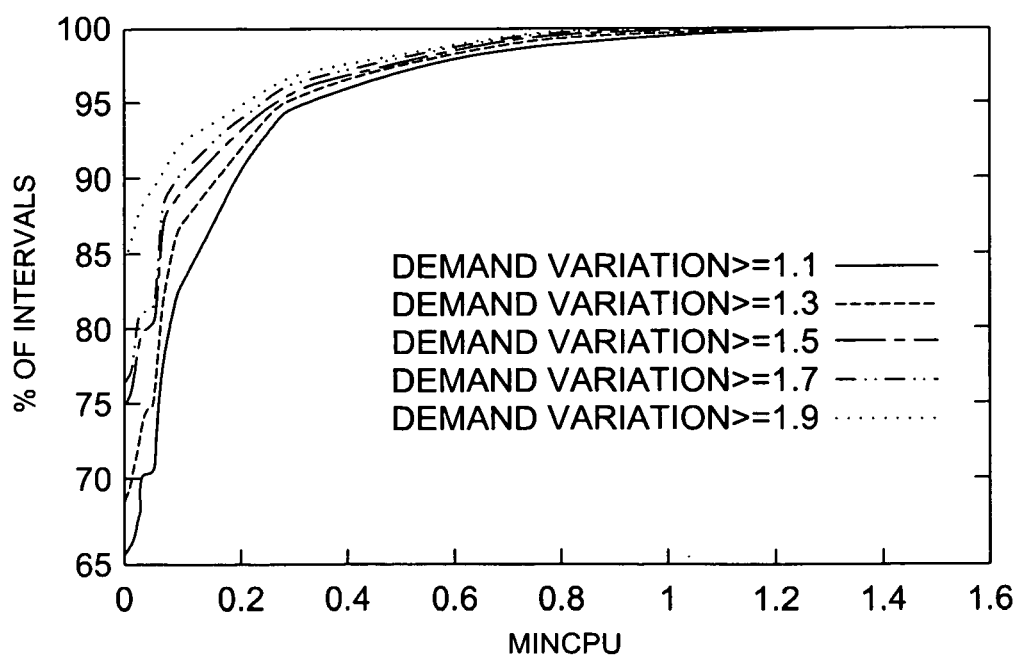

FIGS. 8A-8B show graphs illustrating the percentage of intervals and demands that fall in intervals with demand variation less than specific thresholds, respectively, for this exemplary case study. Each of FIGS. 8A-8B has several curves, one per threshold.

Consider the limits of 1.3 and 1.1. FIG. 8B shows that with a minCPU=0.6, approximately 3% or 4% of time intervals in the workload under evaluation in this exemplary case study will cause reallocations and negatively impact $Q^D$. FIG. 8A shows that these points correspond to roughly 20% of the total demand in this exemplary case study. A minCPU=0.8 has only 2% of the points causing reallocations and affects approximately 14% of the demand, in this exemplary case study. From FIG. 8A, the top 1% of points correspond to the top 10% of demands in this exemplary case study.

Resource sharing will always have an impact on application QoS. In general, a system administrator aims to find a trade-off that provides acceptable application QoS and makes efficient use of resources, i.e., economically sound based on business need. As discussed further herein, understanding the nature of workload and its burstiness nature is important: if the workload is extremely bursty (i.e., with high demand variation), then a workload manager with defined parameters setting a small range utilization of allocation will be providing a poor QoS service. An alternative can be either increasing the range utilization of allocation or to use a fast allocation policy, such as that described in concurrently filed and commonly assigned U.S. patent application Ser. No. 11/489,967 titled "SYSTEM AND METHOD FOR ALLOCATING CAPACITY OF SHARED RESOURCES TO A WORKLOAD", the disclosure of which is hereby incorporated herein by reference.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 9:
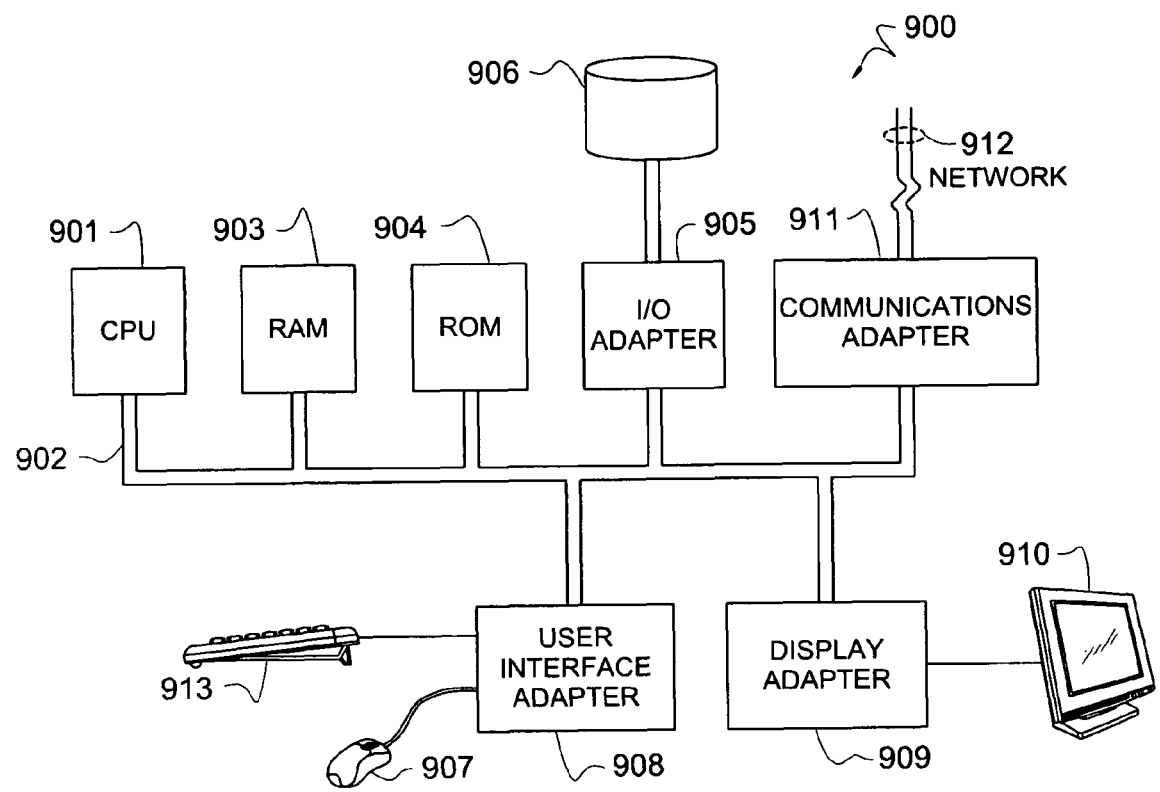
FIG. 9 shows an exemplary system on which the workload evaluator may be implemented according to one embodiment of the present invention.

FIG. 9 illustrates an exemplary computer system 900 on which the workload evaluator 14 may be implemented according to one embodiment of the present invention. Central processing unit (CPU) 901 is coupled to system bus 902. CPU 901 may be any general-purpose CPU. The present invention is not restricted by the architecture of CPU 901 (or other components of exemplary system 900) as long as CPU 901 (and other components of system 900) supports the inventive operations as described herein. CPU 901 may execute the various logical instructions according to embodiments of the present invention. For example, CPU 901 may execute machine-level instructions according to the exemplary operational flows described above in conjunction with FIGS. 2 and 5-6.

Computer system 900 also preferably includes random access memory (RAM) 903, which may be SRAM, DRAM, SDRAM, or the like. Computer system 900 preferably includes read-only memory (ROM) 904 which may be PROM, EPROM, EEPROM, or the like. RAM 903 and ROM 904 hold user and system data and programs, as is well known in the art.

Computer system 900 also preferably includes input/output (I/O) adapter 905, communications adapter 911, user interface adapter 908, and display adapter 909. I/O adapter 905, user interface adapter 908, and/or communications adapter 911 may, in certain embodiments, enable a user to interact with computer system 900 in order to input information.

I/O adapter 905 preferably connects to storage device(s) 906, such as one or more of hard drive, compact disc (CD) drive, floppy disk drive, tape drive, etc. to computer system 900. The storage devices may be utilized when RAM 903 is insufficient for the memory requirements associated with storing data for operations of the workload evaluator 14 (e.g., representative workload 12). Communications adapter 911 is preferably adapted to couple computer system 900 to network 912, which may enable information to be input to and/or output from system 900 via such network 912 (e.g., the Internet or other wide-area network, a local-area network, a public or private switched telephony network, a wireless network, any combination of the foregoing). For instance, a representative workload 12 may be input to system 900 via network 912 from a remote computer, and a determined workload evaluation 16 computed by the workload evaluator 14 may be output and communicated via network 912 (e.g., to a workload manager evaluator, such as described above with FIG. 7). User interface adapter 908 couples user input devices, such as keyboard 913, pointing device 907, and microphone 914 and/or output devices, such as speaker(s) 915 to computer system 900. Display adapter 909 is driven by CPU 901 to control the display on display device 910 to, for example, display information regarding the determined evaluation 16 of a workload 12 under evaluation according to certain embodiments of the present invention.

It shall be appreciated that the present invention is not limited to the architecture of system 900. For example, any suitable processor-based device may be utilized for implementing workload evaluator 14, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

What is claimed is:

1. A method for evaluating a representative workload and its impact on the performance of a workload manager comprising a control algorithm, the method comprising:
receiving, by a workload evaluator, the representative workload that comprises a plurality of competing demands for capacity of at least one shared resource;
evaluating, by the workload evaluator, the representative workload to determine at least one characteristic of the representative workload, the at least one characteristic comprising a metric representing a degree of burstiness, the metric computed as a percentage of successive demands having an increase in demand less than a specified demand variation;
determining, based at least in part on the at least one characteristic of the workload, an impact of expected workload of the representative workload on the performance of the workload manager in managing access of the representative workload to the capacity of the at least one shared resource; and
evaluating at least one scheduler parameter setting of the workload manager based at least in part on the determined impact of expected workload of the representative workload on performance of the workload manager.

2. The method of claim 1, comprising computing, by the workload manager, the metric ($B^D$) representing the degree of burstiness, the metric ($B^D$) computed as a percentage of successive demands having an increase in demand less than a specified demand variation as follows:

$$B^D = \frac{\sum_{i=0}^{i=T} D_i}{D} \text{ such that } \frac{\max(\text{Demand\_min Resource}, D_i)}{\max(\text{Demand\_min Resource}, D_{i-1})} \leq \text{demand\_variation},$$

wherein the representative workload comprises resource access demands for intervals i=1, . . . , T, wherein $D_i$ represents demand for access to the shared resource for interval i, wherein Demand_minResource is a threshold defining a boundary for demands of interest in the representative workload, and wherein demand-variation defines a limit on a ratio in successive demands present in the representative workload that are of interest.

3. The method of claim 2 comprising defining Demand_minResource as Demand_minResource=minResource allocation/demand_variation, wherein minResource allocation is a scheduler control parameter that defines a minimum allocation of the at least one shared resource for a respective consumer during any scheduling interval.

4. The method of claim 2 comprising defining demand_variation as $$\text{demand\_variation} = \frac{upperAllocUtil}{lowerAllocUtil},$$

wherein lowerAllocUtil is a scheduler control parameter that triggers a decrease of allocation of capacity of the at least one shared resource to a consumer when utilization of the at least one shared resource by the consumer drops below the lowerAllocUtil parameter, and wherein upperAllocUtil is a scheduler control parameter that triggers an increase of allocation of capacity of the at least one shared resource to a consumer when utilization of the at least one shared resource by the consumer increases above the upperAllocUtil parameter.

5. The method of claim 1 wherein the at least one scheduler parameter setting comprises a lowerAllocUtil threshold parameter, wherein the lowerAllocUtil threshold parameter triggers a decrease of allocation of capacity of the at least one shared resource to a consumer when utilization of the at least one shared resource by the consumer drops below the lowerAllocUtil threshold parameter.

6. The method of claim 1 wherein the determining an impact of expected workload of the representative workload on performance of the workload manager comprises estimating, based at least in part on the at least one characteristic of the workload, an upper bound on quality of service provided by the workload manager to the representative workload.

7. The method of claim 1, wherein the successive demands are demands of interest in the representative workload to access a shared resource of the at least one shared resource over a plurality of scheduled intervals, wherein the demand variation defines a limit on a ratio of the successive demands, and wherein the ratio incorporates a threshold defining a boundary for successive demands, and incorporates a minimum allocation of the shared resource for a respective consumer during the scheduled intervals.

8. The method of claim 1, wherein the performance of the workload manager comprises specifying a parameter setting to achieve a desired application quality of service (QoS) and to reduce over allocation of the at least one shared resource.

9. A non-transitory computer-readable medium comprising computer-executable code executed by a processor, the computer-executable code comprising:
  code for receiving a representative workload that comprises competing demands for capacity of at least one shared resource;
  code for evaluating the representative workload to determine a metric representing a degree of burstiness of the representative workload, the metric computed as a percentage of demands in successive scheduling intervals having an increase in demand that meets a specified correlation to a demand variation;
  code for determining, based at least in part on the determined metric representing the degree of burstiness of the representative workload, an impact that expected workload of the representative workload will have on performance of a workload manager in managing access of the representative workload to capacity of the at least one shared resource; and
  code for evaluating at least one scheduler parameter setting of the workload manager based at least in part on the determined impact of expected workload of the representative workload on performance of the workload manager.

10. The non-transitory computer-readable medium of claim 9, wherein the code to determine the metric comprises code for computing the metric ($B^D$) representing the degree of burstiness as a percentage of successive demands having an increase in demand less than a specified demand variation as follows:

$$B^D = \frac{\sum_{i=0}^{i=T} D_i}{D} \text{ such that } \frac{\max(\text{Demand\_min Resource}, D_i)}{\max(\text{Demand\_min Resource}, D_{i-1})} \leq \text{demand\_variation},$$

wherein the representative workload comprises resource access demands for intervals i=1, ..., T, wherein $D_i$ represents demand for access to the shared resource for interval i, wherein Demand_minResource is a threshold defining a boundary for demands of interest in the representative workload, and wherein demand-variation defines a limit on a ratio in successive demands present in the representative workload that are of interest.

11. The non-transitory computer-readable medium of claim 10 comprising code for defining Demand_minResource as Demand_minResource=minResource allocation/demand_variation, wherein minResource allocation is a scheduler control parameter that defines a minimum allocation of the at least one shared resource for a respective consumer during any scheduling interval.

12. The non-transitory computer-readable medium of claim 11 comprising code for defining demand_variation as $$\text{demand\_variation} = \frac{upperAllocUtil}{lowerAllocUtil},$$

wherein lowerAllocUtil is a scheduler control parameter that triggers a decrease of allocation of capacity of the at least one shared resource to a consumer when utilization of the at least one shared resource by the consumer drops below the lowerAllocUtil parameter, and wherein upperAllocUtil is a scheduler control parameter that triggers an increase of allocation of capacity of the at least one shared resource to a consumer when utilization of the at least one shared resource by the consumer increases above the upperAllocUtil parameter.

13. The non-transitory computer-readable medium of claim 9 wherein the at least one scheduler parameter setting comprises a lowerAllocUtil threshold parameter, wherein the lowerAllocUtil threshold parameter triggers a decrease of allocation of capacity of the at least one shared resource to a consumer when utilization of the at least one shared resource by the consumer drops below the lowerAllocUtil threshold parameter.

14. The non-transitory computer-readable medium of claim 9 wherein the code for determining an impact of expected workload of the representative workload on performance of the workload manager comprises code for estimating, based at least in part on the metric representing the degree of burstiness of the workload, an upper bound on quality of service provided by the workload manager to the representative workload.

15. The non-transitory computer-readable medium of claim 14 comprising code for estimating a metric $Q^D$ that defines a percentage of overall demand of the representative workload for which sufficient access to the at least one shared resource is allocated by the workload manager to be within a desired quality of service range.

16. A system for evaluating a representative workload and its impact on the performance of a workload manager, the system comprising:
  a processor; and
  a workload evaluator stored in memory and executable via the processor:
    to receive the representative workload that is representative of competing demands for capacity of at least one shared computing resource;
    to evaluate the representative workload and compute a metric representing a degree of burstiness of demands present in the representative workload, wherein the degree of burstiness represents the degree to which demands present in the representative workload vary between successive scheduling intervals, and wherein the metric is computed as a percentage of successive demands of interest having an increase in demand in successive scheduling intervals less than a specified demand variation to determine, based at least in part on the metric, an impact of expected workload of the representative workload on the performance of the workload manager in managing access of the representative workload to the capacity of the at least one shared resource; and to evaluate at least one scheduler parameter setting of the workload manager based at least in part on the determined impact of expected workload of the representative workload on performance of the workload manager.

17. The system of claim 16 wherein the at least one shared computing resource comprises at least one central processing unit (CPU).

* * * * *